United States Patent

Manuali et al.

[15] 3,648,114

[45] Mar. 7, 1972

[54] STRUCTURAL ASSEMBLY FOR A THREE-PLATE CIRCUIT OR THE LIKE WHICH INCLUDES AT LEAST ONE DIODE OR OTHER ELECTRONIC COMPONENT

[72] Inventors: Bertrand Claude Marcel Jean Manuali, Villiers-sur-Orge; Robert Doullet, Paris; Denis Jacques Laedlein, Villennes-sur-Seine, all of France

[73] Assignee: Centre National D'Etudes Spatiales, Paris, France

[22] Filed: Dec. 29, 1970

[21] Appl. No.: 102,291

[30] Foreign Application Priority Data

Jan. 15, 1970 France....................7001438

[52] U.S. Cl.....................317/101 CP, 333/84, 333/7

[51] Int. Cl.....................H05k 1/04

[58] Field of Search......317/101 CM, 101 CP; 333/84 M, 7 333/7

[56] References Cited

UNITED STATES PATENTS

| | | | |
|---|---|---|---|
| 3,218,584 | 11/1965 | Ayer | 317/101 CP |
| 3,337,820 | 8/1967 | Harper | 333/7 |
| 3,417,294 | 12/1968 | Steidlitz | 317/101 CP |
| 3,573,666 | 4/1971 | Caffrey | 333/84 M |

*Primary Examiner*—David Smith, Jr.
*Attorney*—Brufsky, Staas, Breiner and Halsey

[57] ABSTRACT

A structure for a three-plate circuit which includes a diode which must be connected to ground by a capacitor, the latter being formed of two capacities each constituted by the metallization of a supporting plate, a small plate made of Mylar and a metal plate.

Application to structure in which the diodes are easily removable.

5 Claims, 2 Drawing Figures

STRUCTURAL ASSEMBLY FOR A THREE-PLATE CIRCUIT OR THE LIKE WHICH INCLUDES AT LEAST ONE DIODE OR OTHER ELECTRONIC COMPONENT

The invention relates generally to the field of semiconductor devices and more particularly to a structural assembly for a three-plate circuit or the like which includes at least one diode or other semiconductor or electronic component, one electrode of which is to be connected to earth through a capacitor. For example, the subject being dealt with may be a circuit which includes PIN diodes; these diodes are then mounted on an assembly called a "three-plate circuit," thus named because, between two supporting plates consisting of insulating material (one possibly of glass, the other of the material known by the trade mark Teflon, and both of them metallized on one surface to form a plane constituting the earth), there is inserted a third layer (the conducting circuit).

The usual structure for assembling purposes meets with two types of difficulty: on the one hand, when the diodes suffer a breakdown and require to be changed, the operations of dismantling and of reassembly take some considerable time and are costly; on the other hand, the bias to be applied separately to each diode demands insulating means for supply of the biasing voltage.

The invention aims at obviating these difficulties in an ingenious manner by appropriate assembling of the various component parts.

In accordance with the invention, the said assembly comprises at least two plates of some insulating material, at least one of which carries the circuit and receives the said diode or other electronic component, and each of which supports a metallized or metal plane connected to a first point, each of the said planes forming the foil unit of a capacity the dielectric of which is made up of an insulating sheet applied to the said plane and the other foil unit of which, adhering to the insulating layer, is connected to a second point, the combination of these two capacities constituting the above-mentioned capacitor, which is adapted to connect the electrode of the diode or other component to the said first point.

This arrangement makes it possible to avoid having to insulate the conductor feeding in the biasing voltage; furthermore, if there is in addition provided a washer or other appropriately configured unit which fits into a suitable aperture in one of the said plates, then dismantling, changing of the diode and reassembly are all facilitated.

The invention will be further described with reference to a preferred example illustrated in the accompanying drawing, in which.

Figure 1:
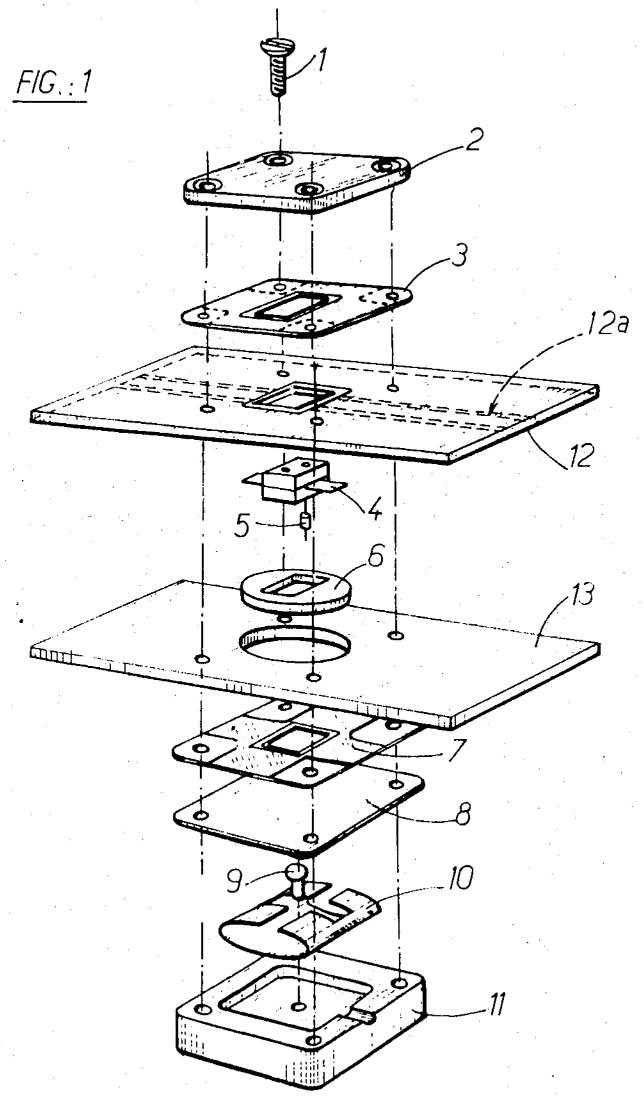
FIG. 1 is an exploded view of the assembly of a PIN diode.

The entire set of components for assembling a diode is visible in FIG. 1. These components comprise the following, having regard to the reference numerals:

1—a clamping screw (there are four of these, only one being shown here);

2—a plate made of cast aluminum, with holes for the passage of the above-mentioned screws;

3—a sheet of Mylar (trade mark) metallized on its lower surface and provided in the center with a rectangular aperture, as well as nonmetallized areas on its lower surface around the holes corresponding to those in plate 2;

12—a Teflon (trade mark) plate carrying metallization on its upper surface, and a printed circuit (see reference numeral 12*a*) on its lower surface; on the upper surface areas free of metallization are provided around the holes through which the screws pass;

4—a switching diode, for example a PIN diode in a rectangular pot;

5—centering pins (one is shown here) which ensure the correct positioning of the diode by passing through corresponding holes (not shown here);

6—a washer made of Teflon and provided with a central rectangular aperture making possible the proper setting in place of the diode 4 (the further central apertures, rectangular in shape, of the other components 3, 12, 7 also make this setting possible);

13—a plate made of Teflon, metallized across its lower part, with areas free of metallization around the holes through which screws pass;

7—a plate made of Mylar, metallized across the upper part except for rectangular areas around the holes through which the screws pass, the plate being provided with a rectangular central hole;

8—a plate made of foil (beryllium-bronze);

9—a rivet;

10—a spring in the form of a leaf bent over at either end, provided with a lateral slot and pierced by an axial hole;

11—a case for spring 10, the case being of cast aluminum and including at its base a recessed area required to accommodate the spring, a groove on one side to allow the passing of a wire, four tapped holes corresponding to the thread of screws 1, and a central aperture to receive rivet 9 with a force fit.

Figure 2:
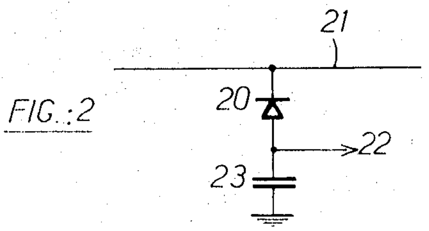
FIG. 2 is the electrical diagram associated with said assembly.

When referring in FIG. 2, the diagram showing the principle of assembling a PIN diode should also be borne in mind. Diode 20 is connected at one end to a line 21 and at the other end on the one hand to a biasing source 22, and on the other hand by way of a capacitor 23 to earth.

This being the position, it is necessary to understand that in the construction of the three-plate circuit (FIG. 1) there exist two earthing planes, namely the upper surface of plate 12 and the lower surface of plate 13, both metallized These earths are interconnected at the end of plates 12 and 13 in a manner not shown here. It is to these earths that the capacitor 23 is connected which capacitor is in reality made up, in the present case, of two capacities, namely on the one hand the capacity constituted by the component parts 2, 3, 12 having for the dielectric the Mylar material of sheet 3, and on the other hand the capacity made up of the component parts 13, 7, 8 having for the dielectric the Mylar material of plate 7. Under these conditions the second foil of capacitor 23, namely the foil not earthed but connected to the biasing means, is constituted by the plates 2 and 8, the latter being in electrical contact with 11, these plates being assembled both mechanically and electrically together by the screw 1, naturally always on condition that unmetallized areas are provided around the two earthing planes so as to avoid any contact with the earth. It is thus unnecessary to insulate, from the said components 2 and 11, the input connection from the biasing means.

In another connection, the line output from diode 4 is dealt with directly on the printed circuit.

It should now be understood that on the so-called three-plate circuit, constituted by the association of a Teflon plate 13 metallized its lower surface and of a Teflon plate 12 metallized on its upper surface and carrying on its lower surface the printed circuit, there is mounted an entire series of similar diodes (not shown here) which are connected up to the same printed circuit.

Such a structure makes it possible, for example, to bring into being phase shifters, switching mechanisms, limiters, etc., PIN diodes being employed.

The advantage of the assembly technique according to the invention then emerges clearly. On the one hand, when a diode suffers a breakdown, it is not necessary to dismantle the entirety of the three-plate circuit in order to replace the diode, because it is sufficient slightly to undo (for the diode under consideration) the screw 1, so as to detach the parts 11, 10, 9, 8, 7, and to reach the washer 6, which is of a greater diameter than the length of the long side of the rectangle forming the central hole in plate 7. With the said plate, which was supporting the washer, removed, it is possible to remove the washer 6 in its turn and to lift out the defective diode. In this way the time taken and the cost of maintaining and servicing electrical circuits as carried out in this manner are greatly reduced.

Nevertheless, the washer 6 ensures the continuity of the dielectric.

On the other hand, with the diode biased by way of its case with attachment means 11 and of the capacitance-type decoupling system described, it is possible to control the various diodes of a single electrical circuit independently.

It will be apparent that modifications may be made in the embodiment just described, more especially by replacing the parts with equivalent technical means, without however thereby going beyond the scope of the invention as defined in the appended claims.

We claim:

1. Means of assembling a PIN diode or other semiconductor or electronic component one electrode of which, receiving a biasing voltage, is to be connected to a reference potential by a capacitor, said means including: at least two plates made of insulating material and having an excision to accommodate the diode, a metallized circuit on at least one of the internal surfaces of the said plates, a layer of metal on each of the outer faces of the two plates, the said layers of metal being intended for connection to the reference potential, an insulating sheet applied on each of the metallized planes, this being of limited surface area and of a form adapted to enclose each of the diodes, metal covers covering the insulating sheets and the diode on either side of the combination of the two above-mentioned plates, made of insulating material, along with the metallized circuit, connection means to link the two covers electrically while exerting a clamping effect on the combination of plates and sheets, and to bring up the covers to the reference potential, the combination of the two capacities, each formed of an insulating sheet, being included between a layer of metal and a so-called cover which constituted the above-mentioned capacitor.

2. Means of assembling a PIN diode or the like according to claim 1, in which the said connecting means associated with the two covers consist of junction elements of the rod or screw type, while the plates of insulating material, the insulating sheets and the covers are drilled through to allow the passage of the said junction elements, metallization being absent around the holes drilled in the plates and the insulating sheets.

3. Means of assembling a PIN diode or the like according to claim 1, in which the excised area in the plate to receive the diode is made up of a cover which is slightly larger than the diode and in the interior of which there is placed, in a removable manner, a conjugate unit which is itself provided with an inner excised area which fits around the diode.

4. Means of assembling a PIN diode or the like according to claim 2, in which means there is a spring device inserted under at least one of the covers so as to be capable of exerting a resilient squeezing action.

5. Means of assembling a PIN diode or the like according to claim 2, in which one of the covers is hollow in order to accommodate within its internal hollow space a spring in the shape of a leaf with the ends bent over, and the cover carries the requisite threads for the squeezing action of the junction elements.

* * * * *